US00RE35208E

United States Patent [19]

Finkelstein

[11] E Patent Number: Re. 35,208

[45] Reissued Date of Patent: Apr. 16, 1996

[54] FENCE SLAT CONSTRUCTION

[75] Inventor: Harvey Finkelstein, Hewitt, N.J.

[73] Assignee: Tri-Seal International, Inc., Blauvelt, N.Y.

[21] Appl. No.: 228,528

[22] Filed: Apr. 15, 1994

Related U.S. Patent Documents

Reissue of:

[64] Patent No.: 5,106,058
Issued: Apr. 21, 1992
Appl. No.: 749,168
Filed: Aug. 23, 1991

[51] Int. Cl.[6] ..... B21F 27/00

[52] U.S. Cl. ..... 256/34; 256/32; 245/11

[58] Field of Search ..... 256/34, 32, 35, 256/1, 66, 65, 22; 245/11

[56] References Cited

U.S. PATENT DOCUMENTS 4,512,556 4/1985 Meglino ..... 256/34
4,860,997 8/1989 Schoenheit et al. ..... 256/34
4,860,998 8/1989 Snyder ..... 256/34
5,007,619 4/1991 Sibeni ..... 256/34

*Primary Examiner*—Dave W. Arola
*Assistant Examiner*—Christopher J. Novosad
*Attorney, Agent, or Firm*—Lowe, Price, LeBlanc & Becker

[57] ABSTRACT

Slat apparatus for a chain link fence, comprising a plurality of substantially parallel slats extending through the fence wires. Each slat has laterally extending wing portions positioned closely adjacent to the wing portions of adjoining slats to provide privacy by leaving only small spaces between the slats. The slats have apertures extending laterally therethrough rearwardly of the wing portions. The slat apertures are laterally aligned and a flexible belt extends through the apertures to retain the slats in parallel relation on the fence. The wing portions are of less thickness than the slats.

5 Claims, 2 Drawing Sheets

FENCE SLAT CONSTRUCTION

Matter enclosed in heavy brackets [ ] appears in the original patent but forms no part of this reissue specification; matter printed in italics indicates the additions made by reissue.

BACKGROUND OF THE INVENTION

The present invention relates to a slat construction for chain link fences or the like and, more particularly, to such a construction wherein the slats are constructed to provide privacy when in side by side relation and are retained in position on the fence in a new and improved manner.

For the purpose of providing privacy, wind protection and/or decoration, slats have been inserted or woven in chain link fences. In most cases, the slats have been so constructed or inserted in the fence that they are not closely adjacent to each other and thus do not provide adequate privacy. Such a fence slat construction is disclosed in the patent to Meglino, U.S. Pat. No. 4,512,556.

Slats having laterally extending fin portions that are closely spaced when inserted in a chain link fence or the like to provide a privacy feature are disclosed in the patent to Sibeni, U.S. Pat. No. 5,007,619. Because of the fin portions, however, it has been difficult to use a relatively simple slat retaining means such as the connecting member extending through aligned slat apertures shown in the above-reference Meglino patent. The Sibeni patent, therefore, utilizes a rather complicated and expensive construction for retaining the slats in position on the fence. This retaining construction requires the use of upper and lower channel members for the slats, and also the provision of lock tabs on the ends of the slats.

The new and improved slat construction of the present invention provides the desired privacy feature of the Sibeni patent and also a simple and effective means for retaining the slats in the desired position on the chain link fence which is not subject to the disadvantages of the retaining assembly of the Sibeni patent.

SUMMARY OF THE INVENTION

The slat construction of the present invention comprises tubular slats having laterally extending, thin wing or fin portions that can be positioned closely adjacent to each other when the slats are inserted or woven in a chain link fence in substantially parallel relation like that shown in the Sibeni patent. To retain the slats in the desired parallel positions on the fence, the slats of the present invention are provided with thin transverse apertures extending therethrough on one side of the wing portions thereof. These apertures are laterally aligned when the slats are in the desired parallel positions on the fence. A thin flexible belt extends laterally through the apertures to retain them in parallel position on the fence. The ends of the belt may be retained in any suitable manner on the fence.

In this manner, the slat construction of the present invention provides a simple, effective and inexpensive means of mounting privacy slats on a chain link fence and is a considerable improvement over the slat construction in the Sibeni patent.

DESCRIPTION OF THE PREFERRED EMBODIMENTS

Figure 1:
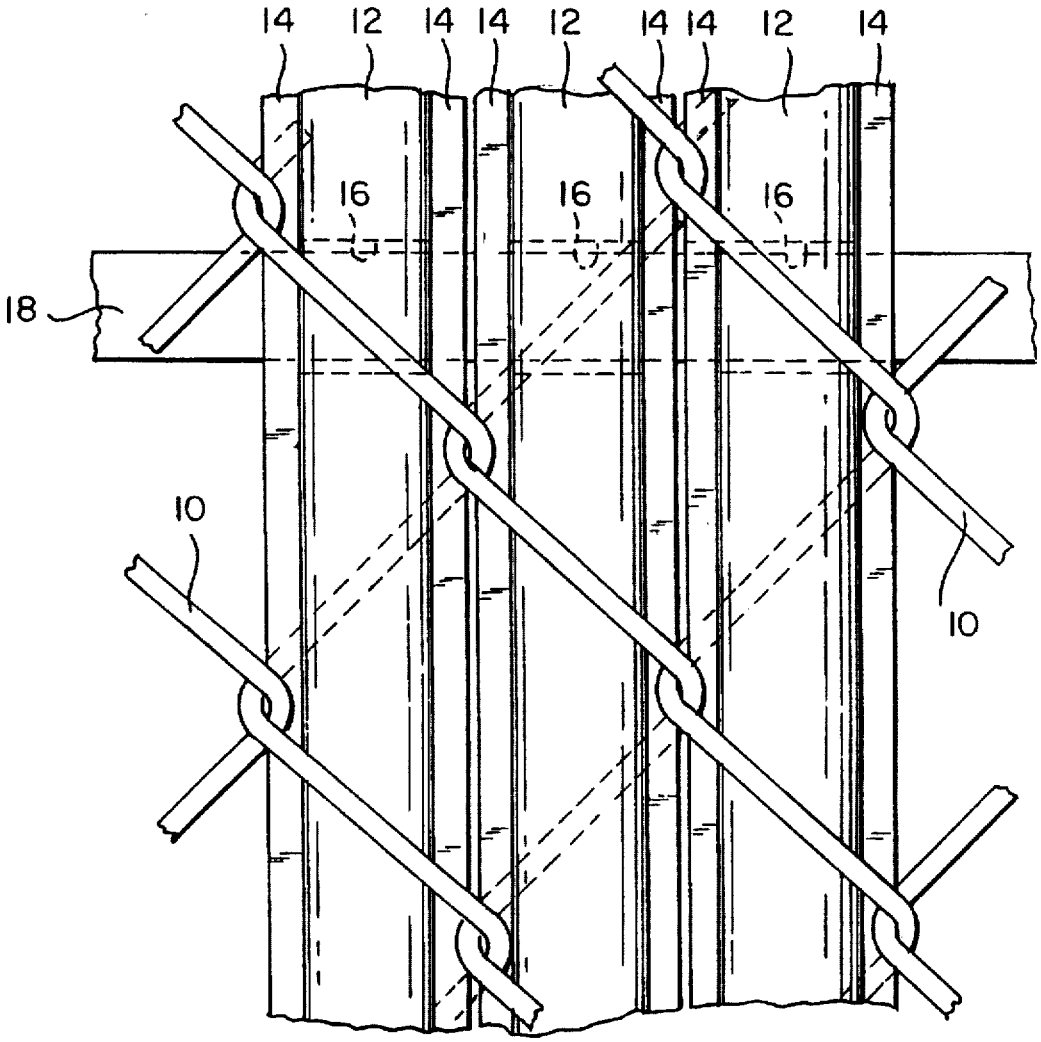
FIG. 1 is a front elevational view of a portion of a chain link fence with the slats of the present invention inserted therein and retained in substantially parallel relation thereon.

FIG. 1 illustrates a portion of a chain link fence comprising a plurality of interlocking wires 10 that are mounted on upper and lower support members (not shown) in a well known manner. A plurality of slats 12 are inserted or woven through the wires in substantially parallel relation. Preferably, the slats are of tubular construction as shown in FIG. 1. The slats 12 may be formed of any suitable material such as plastic.

To provide privacy, the slats 12 comprise laterally outwardly extending wing portions 14 of reduced thickness that are disposed closely adjacent to each other to leave only small spaces between the slats. Preferably, the wing portions 14 are formed integrally with the slats 12, are of solid construction and taper outwardly and inwardly from the slats.

Figure 3:
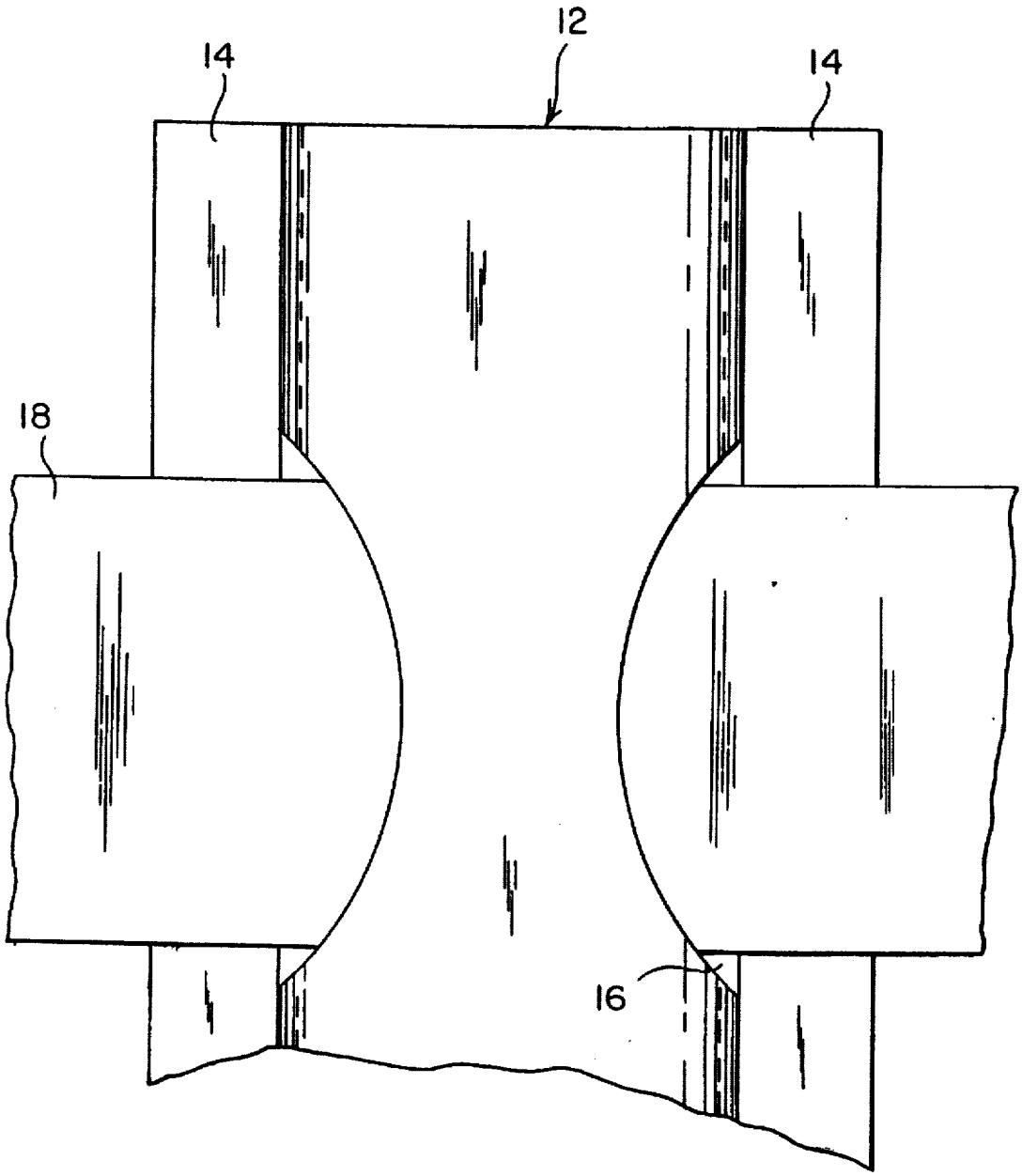
FIG. 3 is an enlarged rear elevational view of an upper portion of a fence slat of the present invention with a flexible belt retaining means extending through the transverse aperture thereof.

The slats 12 each have an aperture 16 extending laterally therethrough rearwardly of the wing portions 14, as shown in FIG. 3. The apertures 16 are laterally aligned when the slats 12 are inserted in the wires of the fence in the manner shown in FIG. 1. The apertures 16 may have any desired size and shape.

Figure 2:
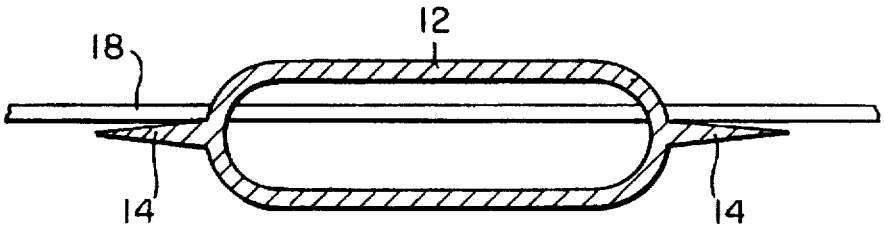
FIG. 2 is an enlarged cross sectional view of a fence slat constructed in accordance with the present invention, showing a flexible belt retaining means extending therethrough.

For the purposes of retaining the slats 12 in the desired parallel positions on the fence wires 10, a flexible belt 18 (FIGS. 1–3) is inserted laterally through the apertures 16 of the slats and is secured in any suitable manner at its ends (not shown) to the fence. The height or transverse dimension of the belt 18 preferably is only slightly less than that of the apertures 16 to minimize movement of the slats 12 on the fence wires. The belt 18 may be formed of any suitable flexible material, such as plastic, rubber or the like, and may have any suitable cross sectional shape. Preferably, the belt 18 is of generally flat configuration for ease of manufacture and is of the same exterior appearance as the slats. Because the belt extends laterally behind the wing portions 14 of the slats 12, it is barely visible from the front side of the fence, as shown in FIG. 1, and thus does not adversely affect the appearance of the parallel slats on the fence. *The belt 18 and aperture 16 can be of different cross sectional shape.*

From the foregoing description, it will be readily seen that the present invention provides a new and improved slat and flexible belt construction that insures privacy, is easy to use and is simple and inexpensive to manufacture.

What is claimed is:

1. Slat apparatus for a chain link fence having linking wires, comprising:

a plurality of substantially parallel slats extending through the wires, *each slat having a front face and a rear face*, each of said slats having laterally extending wing portions positioned closely adjacent to the wing portions of adjoining slats to provide privacy by making it difficult to see through the small spaces between adjoining slats;

each of said slats having an aperture of elongated cross section extending laterally therethrough [and], *each*

*aperture* positioned [rearwardly of] *between the rear face and* said wing portions *of said slat*, said apertures in said slats being laterally aligned; and a substantially flat flexible belt of elongated cross section extending laterally through said apertures in said slats to retain them in substantially parallel relation on the fence[, said belt being secured to the fence].

2. The slat apparatus of claim 1 wherein said wing portions are of smaller thickness than that of said slats.

3. The slat apparatus of claim 2 wherein *each* said wing [portions are] *portions is* tapered [laterally outwardly and inwardly from said slats] *in cross section when laterally extending from said slat*.

4. The slat apparatus of claim 2 wherein said slats are of tubular construction and said wing portions are of solid construction.

5. The slat apparatus of claim 1 wherein said apertures and said belt are of different cross sectional shape.

* * * * *